(12) United States Patent
Pellar

(10) Patent No.: US 7,768,673 B2
(45) Date of Patent: Aug. 3, 2010

(54) GENERATING MULTI-BIT HALFTONE DITHER PATTERNS WITH DISTINCT FOREGROUND AND BACKGROUND GRAY SCALE LEVELS

(75) Inventor: Ronald Pellar, Orange, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 477 days.

(21) Appl. No.: 11/224,419

(22) Filed: Sep. 12, 2005

(65) Prior Publication Data

US 2007/0058203 A1 Mar. 15, 2007

(51) Int. Cl.
G06K 15/00 (2006.01)
(52) U.S. Cl. ............... 358/3.13; 358/1.9; 358/3.06; 358/3.1; 358/3.23; 358/534; 347/15
(58) Field of Classification Search ........... 358/3.13, 358/1.9, 3.06, 465, 534, 3.23, 3.14, 3.21; 382/237, 270; 347/15
See application file for complete search history.

(56) References Cited

U.S. PATENT DOCUMENTS

| | | | |
|---|---|---|---|
| 4,149,183 A | 4/1979 | Pellar et al. | |
| 4,196,451 A | 4/1980 | Pellar | |
| 5,195,175 A * | 3/1993 | Kanno et al. | 358/1.6 |
| 5,196,942 A | 3/1993 | Shiau | |
| 5,499,305 A | 3/1996 | Lidke et al. | |
| 5,726,772 A | 3/1998 | Parker et al. | |
| 5,771,105 A | 6/1998 | Rust et al. | |
| 5,805,734 A * | 9/1998 | Ebner | 382/237 |
| 6,014,226 A * | 1/2000 | Harrington et al. | 358/1.9 |
| 6,059,404 A * | 5/2000 | Jaeger et al. | 347/88 |
| 6,091,511 A | 7/2000 | Ben Dror et al. | |
| 6,356,360 B1 * | 3/2002 | Rushing et al. | 358/1.9 |
| 6,683,360 B1 | 1/2004 | Dierickx | |
| 6,714,322 B1 | 3/2004 | Minamino | |
| 6,757,079 B1 * | 6/2004 | Chen | 358/3.05 |
| 6,999,203 B1 * | 2/2006 | Kim | 358/3.12 |
| 7,233,339 B2 * | 6/2007 | Bae et al. | 345/596 |
| 2003/0043412 A1 | 3/2003 | Roylance | |
| 2003/0117654 A1 | 6/2003 | Wredenhagen et al. | |

(Continued)

FOREIGN PATENT DOCUMENTS

EP 710006 A2 * 5/1996

OTHER PUBLICATIONS

Metaxas, "Parallel Digital Halftoning by Error-Diffusion", Jun. 2003, ACM, PCK50, pp. 35-41.*

(Continued)

*Primary Examiner*—Mark K Zimmerman
*Assistant Examiner*—Javier J Ramos
(74) *Attorney, Agent, or Firm*—Tucker Ellis & West LLP

(57) ABSTRACT

A multi-bit halftone generating system provides for halftone intergeneration in printers which can print dots of plural gray scale levels. Input image data includes information for more gray scale levels than can be handled by those associated with a printing device. Higher order bits of the pixels of the electronic document are used to select a gray scale level from those available from the printer. Remaining bits are used to generate a halftone pattern which is superimposed upon this selected gray scale. Thus, improved dither rendering is quickly and efficiently accomplished and improved image generation results from using the gray scales available from the printing device.

14 Claims, 3 Drawing Sheets

U.S. PATENT DOCUMENTS

2003/0210430 A1    11/2003  Nose et al.
2004/0062437 A1*   4/2004   Luo et al. .................. 382/166
2004/0080789 A1    4/2004   Anderson
2005/0068344 A1*   3/2005   Kurumisawa ............... 345/690
2006/0244981 A1*   11/2006  Li et al. ....................... 358/1.9

OTHER PUBLICATIONS

Pirsch et al., "Transmission of Gray Level Images by Multilevel Dither Techniques", 1983, Computers & Graphics, vol. 7, No. 1, pp. 31-44.*

* cited by examiner

GENERATING MULTI-BIT HALFTONE DITHER PATTERNS WITH DISTINCT FOREGROUND AND BACKGROUND GRAY SCALE LEVELS

BACKGROUND

The subject invention relates generally to document rendering, and more particularly to rendering of gray scale images with devices that have a limited ability to print elements or data with a finite number of gray scale levels. The invention is particularly applicable to image rendering from printing devices. However, it will be appreciated that the teachings herein are suitably used in connection with any image rendering device.

Halftoning is a process by which gray scale images may be generated on a device that may, for example, only produce black dots on a white background. In a halftoning system, a small area or array of dots is treated as a large picture element ("halftone cell"). While this area is substantially larger than that of a dot, selectively turning on various dots or patterns of dots in this area allows it to be perceived, from a distance, as having a shade of gray associated with such a dot arrangement. These "dithered" areas are constructed so as to be placed to allow for visual perception of gray levels to be associated with each such area. Thus, halftoning allows for a trade off between resolution and gray scale. This allows for generation of fairly accurate, black-and-white images from a monotone document rendering device, such as a common laser printer.

More recently, devices such as printers have the ability to generate dots in two or more gray scale levels. While this additional capability allows for generation of high resolution gray scale levels, frequently the number of gray scale levels that are available for generation of a suitable image is insufficient for visual acceptability. Thus, a hybridized system that allows for generation of dithered or halftone images, which system also uses the gray scale capabilities native to a device, is advantageous.

Earlier systems that seek to use a combination of native gray scale levels with halftoning have been heretofore implemented with complicated procedures. Such procedures, for example, may incorporate a mechanism for switching between various arrays, each of which requires a specialized data structure. Additionally, such structures often require unique software or hardware environments to allow for generation of images.

It is desirable to have a system and method that quickly and simply implements halftoning in systems that have limited, native gray scale generation capability and that allows for ready implementation of standardized data structures for output in a multi-bit halftone image rendering device.

SUMMARY OF INVENTION

In accordance with the present invention, there is provided a system and method that quickly and simply implements halftoning in systems that have limited, native gray scale generation capability.

Further, in accordance with the present invention, there is provided a system and method that allows for ready implementation of standardized data structures for output in a multi-bit halftone image rendering device.

In accordance with the present invention, there is provided a system for receiving n-bit encoded image data. This encoded image data includes that representative of a plurality of pixels having $2^n$ gray scale levels, wherein n is an integer greater than one. Further in accordance with the present invention, the system and method include a network for communicating data having $2^n$ available gray scale levels wherein n is an integer greater than one to a document processing device. The system is directed to image rendering on a document processing device which has an ability to generate $2^m$ discrete gray scale levels, wherein m is a positive integer less than n. Any suitable two-dimensional threshold array is suitably utilized. However, in the preferred embodiment, an array is chosen that has $2^{n-m+1}$ elements. In accordance with received image data, one of the available m gray scale levels, or bits, are chosen, and this value is used to generate a dither matrix. This value is chosen in accordance with gray scale levels associated with an input image pixel. Within this matrix, additional dithering is provided to accomplish further gray scale gradations in accordance with an input image pixel.

In accordance with a limited aspect of the present invention, dithering added to a dither matrix is accomplished to further define perceived gray scale for such matrix.

In accordance with a more limited aspect of the present invention, each dither matrix is provided with two gray scale levels, a first being defined as a selected background gray scale level and a second being associated with all elements that are used to selectively populate the dither matrix to accomplish half-toning.

An advantage of the present invention is the provision of a system that quickly and simply implements halftoning in systems that have limited, native gray scale generation capability.

Another advantage is the provision of a system which allows for ready implementation of standardized data structures for output in a multi-bit halftone image rendering device.

Yet another advantage is the provision of an image rendering system which allows for ready utilization of available, native gray scale levels as described in any common printer display language to produce multi-level halftones.

Yet another advantage is the reduced contrast between a dot and its surrounding dots for reduced visibility of the halftone pattern itself when compared to more conventional halftoning techniques.

Further advantages will be appreciated by one of ordinary skill in the art by reading and understanding the subject specification.

BRIEF DESCRIPTION OF THE DRAWINGS

The subject invention will be described in connection with a series of figures, which are used to disclose the preferred embodiment of the invention, and not for the purposes of limiting the same, wherein.

DETAILED DESCRIPTION OF THE PREFERRED EMBODIMENT

Figure 1:
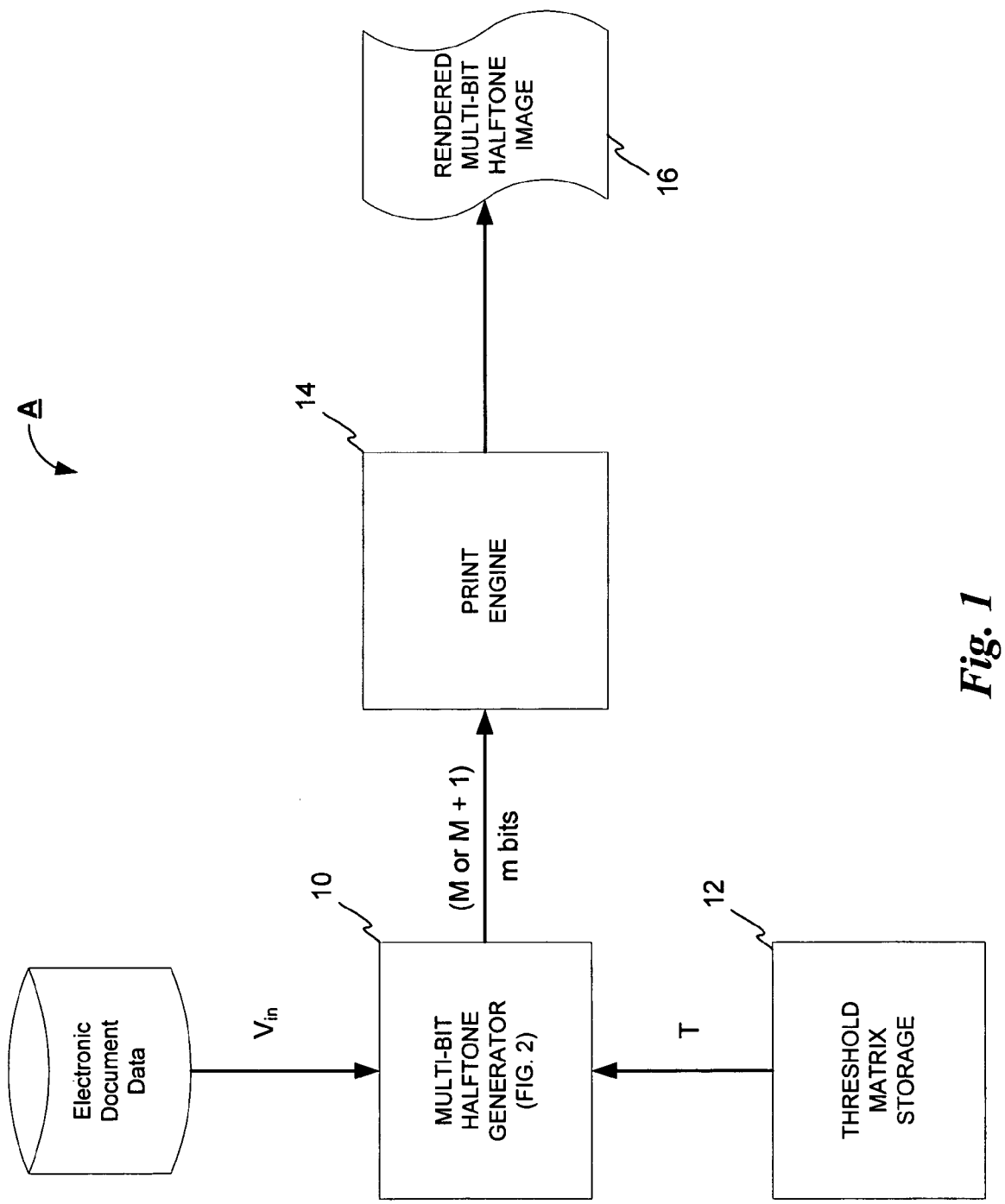
FIG. 1 is a block diagram of an image rendering system using the multi-bit halftone generator of the subject invention.

Turning to FIG. 1, an image rendering system A includes a multi-bit halftone generator 10 that receives electronic document data suitably in any standardized format via any suitable means. In a preferred embodiment, a PostScript format as propagated by Adobe Systems, Inc., is received as a threshold array 12, such as that employed in Adobe Systems Type 1, Type 3, Type 6 or Type 10 formats. However, it is to be appreciated by one of ordinary skill in the art that any suitable page description language is contemplated for use.

The multi-bit halftone generator 10 is connected via any suitable means to receive threshold matrix information from threshold matrix storage 12. The threshold matrix is used to generate halftone patterns as will be described in more detail below. While the preferred embodiment is directed to gray scale halftone generator it is to be appreciated that the subject system is fully capable to generate color tones in systems in which only a limited color palette is available. A multi-bit halftone image that has been generated by the generator 10 is communicated to a print engine 14 for rendering of an image or graphic element 16 therefrom.

Figure 2:
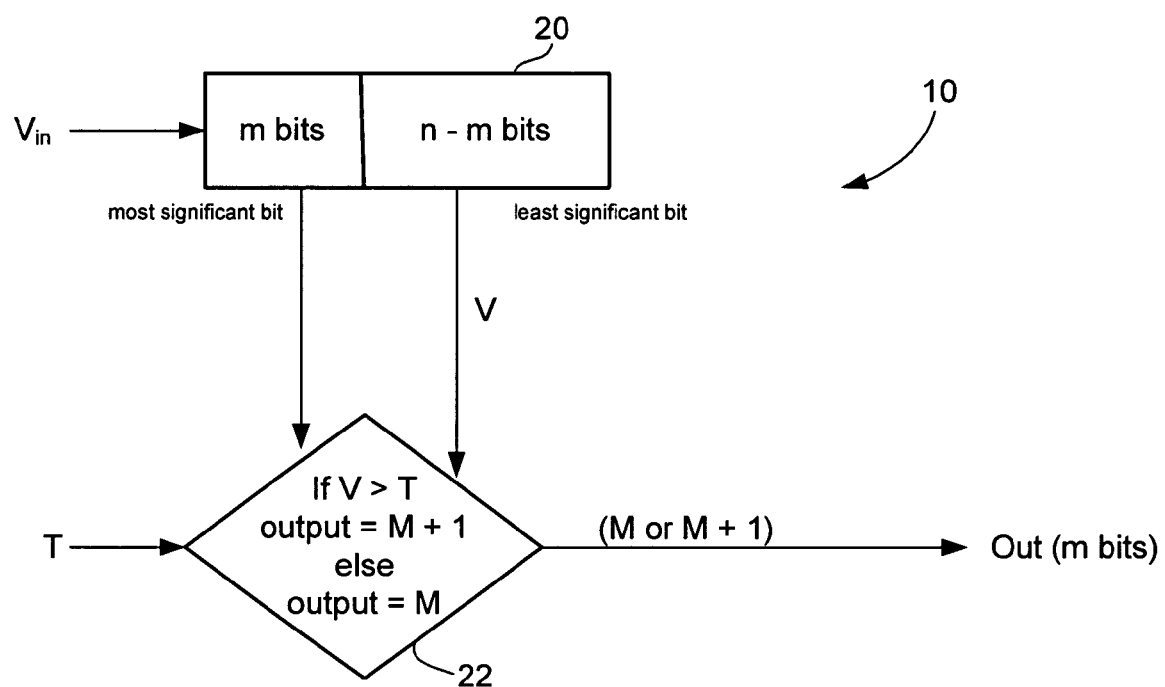
FIG. 2 illustrates a multi-bit halftone generator of the subject invention.

Turning now to FIG. 2, the multi-bit halftoning generator 10 will be described in greater detail. In the subject image rendering, input image information is received in a format having n bits. These n bits provide $2^n$ levels and are used with a threshold array of values to form an image. An output of digital data includes a value corresponding to m bits herein referred to as M or this value incremented by +1, i.e., M+1. It should be noted that 1 is not added in the event that M is of its maximum value, i.e., $2^m-1$. In the event that a threshold array contains to $2^{(n-m+1)}$ levels, than a total number of gray levels, including the printers inherent number of gray levels, will be equal to, or greater than, the full n bits, that is, $2^n$ levels. The subject multi-bit image generator functions to extract information from a digital data input to allow for selection of levels of the various gray scale levels that can be generated by an image rendering device, such as a printer. While a document processing device such as a printer is a preferred embodiment, it will be appreciated by one of ordinary skill in the art that any device that renders an image from digital data is contemplated, such as facsimile machines, visual display terminals, and the like, as well as printers including laser printers, ink jet printers, and the like.

In the preferred embodiment, encoded image data is received which is binary, and is comprised of n bits, wherein n is a positive integer greater than one. Also, in the preferred embodiment, a Little Endian notation is used wherein lower order bits appear rightmost and higher order bits appear leftmost. Such notation is commonly employed, by way of example, in Intel processors. It is to be appreciated that a Big Endian format, wherein lower order bits appear leftmost and higher order bits appear right most, such as found in Motorola processors, is also readily utilized by using the bits in an opposite fashion as that in the illustration.

In the illustration, the higher or more significant m bits are used to select a native gray scale level that can be generated by the image generating device. A lower order or $^{n-m}$ bits are used to provide data values for comparison to a threshold array value. It will be appreciated by one of ordinary skill in the art that an output of a comparison is dependent upon whether an image, array, or both are additive or subtractive. For both image and array values that are subtractive, if an image value is greater than a threshold array value, a comparison operator outputs a value of M as represented by the m bits. Otherwise, it outputs a value of M+1. In the event that the image data and/or threshold data are additive in nature, the comparison is suitably adjusted to generate the correct results. This comparison output is then used as the output of the halftone process. Such extraction, or filtering, of high order m bit and low order $^{n-m}$ bits from image is suitably accomplished by means of masking techniques and/or bit shifting techniques as will be appreciated by one of ordinary skill in the art. As illustrated in FIG. 2, input image data $V_{in}$ is received into a storage location 20, from which location such masking and/or shift operation is suitably accomplished. As illustrated in the Figure, the input image is n bits in length. The most significant m bits are routed to a halftone module 22. The $^{n-m}$ bits of an input image data portion are routed to halftone module 22 from which a determination, as noted above, of output relative to a selected threshold value T will be a zero or a one. A combination of the native resolution and interaction with the threshold array V forms an output value of either M+1 or M which is communicated to the image rendering device (FIG. 1).

Figure 3:
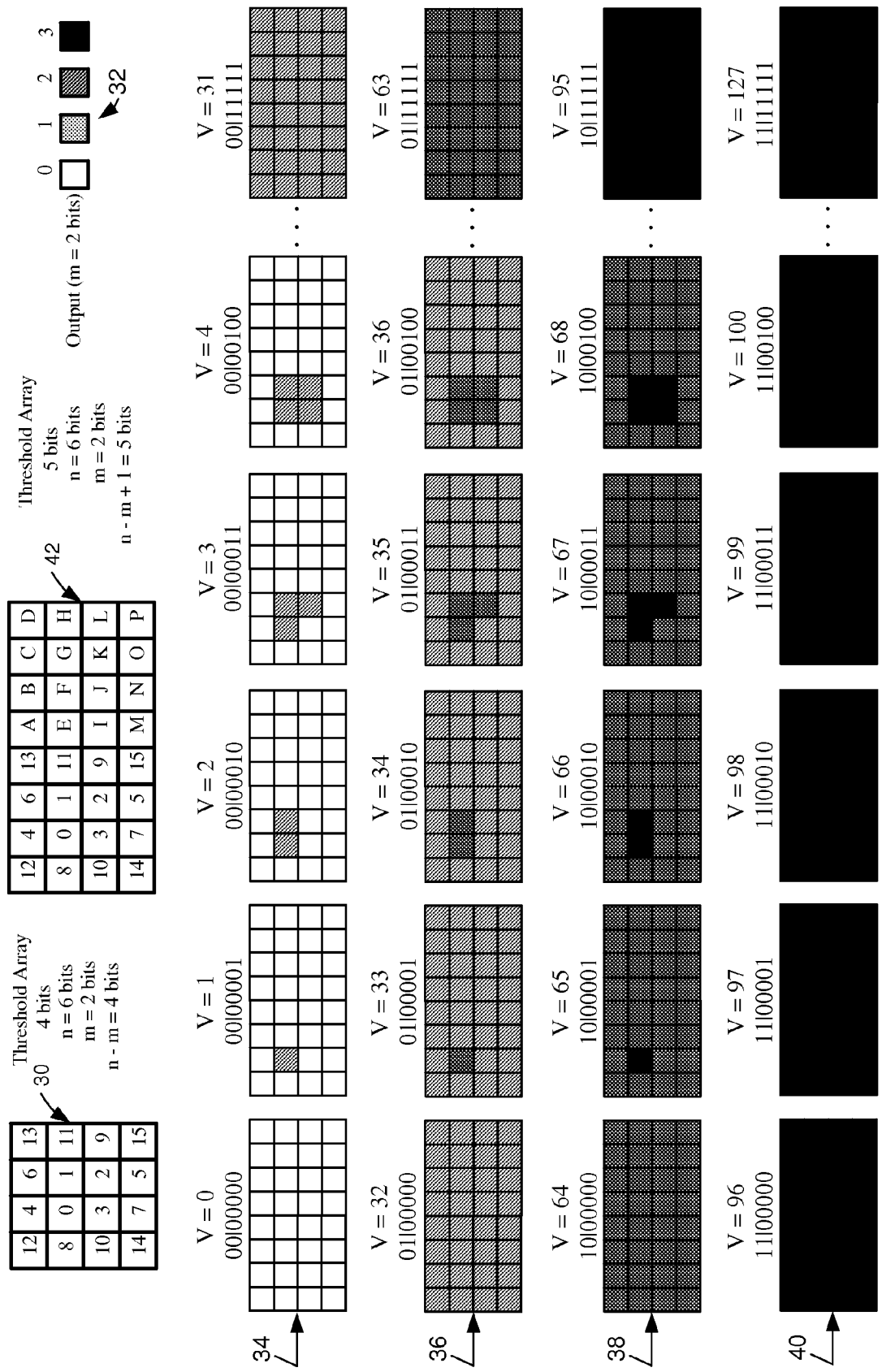
FIG. 3 illustrates a representative example of a multi-bit halftone generation in connection with the subject invention.

Turning now to FIG. 3, illustrated is an example of a multi-bit halftone rendering accomplished in connection with the afore-noted system. In FIG. 3, an input image data element is six bits in length. The image rendering device is capable of rendering dots of four different gray scale levels, i.e., m=2, such that M=0, 1, 2 or 3. While this limited gray scale capability is advantageous, it is insufficient for generating suitable images for viewing, which images employ substantially more colors or shades of gray. In the example, the four gray scale levels that can be output by the image generating device can be represented by two bits, which allows for representation for four possible values 00, 01, 10 and 11. This example sets the value m as two bits, which are the most significant bits from each group of six. The remaining four, n–m bits allow for 16 areas to be represented in an image formed by a threshold array. With specific reference to array 30, illustrated is a threshold array having 16 locations, which is illustrated as a square array which is employed in one embodiment. However, it will be appreciated that any suitable two-dimensional array pattern is readily usable. The numbering in the blocks at 30 shows a build pattern for various bit patterns from the n–m bits. A pattern will be built 0, 1, 2, 3, . . . 15 in the locations of representative threshold array 30. With specific reference to array 42, illustrated is a threshold array having 32 locations, which is illustrated as a rectangular array, which is employed in one embodiment of the subject application. The numbering the blocks at 42 shows a build pattern for various bit patterns from the n–m+1 bits. A pattern will be build 0, 1, 2, 3, . . . P in the locations of representative threshold array 42. The four gray scale dots that can be generated directly by the representative image generation device of the example are shown by 32.

Turning to row 34, illustrated is a build pattern for various gray scale levels associated with a first level of input. As used herein, V illustrates a numeric increase in a series of sets of 6 bits that are received into the multi-bit halftone generating device 10 representing image data to be rendered. It will be noted that the first two bits, corresponding to the highest order bits and the gray scale generation capability native to the output device, have been separated for ease and understanding. In this instance in row 34, it will be appreciated that these first two bits are zero. Thus, the level zero from possible gray scale values listed at 32, selected as white, is chosen as a default color for all pixels. As the lower order n–m+1 bits increase from left to right, the representative box as specified by the build pattern of the threshold array 42 is filled.

Turning next to row 36, it will be noted that the most significant bits in each instance are 0 and 1. This results in a selection of a second gray scale level 1 as illustrated by possible values 32. As V increases from 32, 33, . . . , a build pattern of array 42 is implemented, as it was in connection with row 34. In this instance, the build pattern for lower order bits is selected from gray scale level 2 from available levels 34. It will be appreciated by reference to row 34, as well as 36, that the preferred embodiment herein allows for this array to be selectively populated with a gray scale value 1 higher than that associated with a background level for each array as set by the most significant bit m. It will be appreciated that a similar build pattern is realized in connection with row 38, in which the most significant bits are represented by gray scale level 2 of available levels at 32. Similarly, as V increases from 64, 65, . . . , a build pattern of array 42 is again implemented, this time with dots having gray scale level 3 from available levels illustrated at 32.

With reference to row 40, it will be appreciated that the two most significant bits are 11, which results as a selection of the darkest gray scale level 3 from options listed at 32. It will be noted that this results in an entire array of fully darkened pixels. Thus, at V equals 96, the lower bits are irrelevant insofar as a fully darkened area is resultant. Given this situation, it is advantageous to employ scaling for the subject grayscale levels such that saturation, such as is illustrated by row 40, is avoided by shifting grayscale levels.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A multi-bit halftone generator comprising:
   means adapted for receiving n-bit binary encoded image data, the encoded image data including a plurality of pixels having $2^n$ gray scale levels, wherein n is an integer greater than 3;
   means adapted for communicating data to an associated document processing device, which document processing device includes means for rendering a document having $2^m$ discrete gray scale levels, wherein m is greater than 1 and less than n wherein the document processing device has an ability to generate dots at $2^m$ gray scale levels;
   means adapted for receiving data representative of a two-dimensional threshold array having at least $2^{(n-m+1)}$ elements, which two-dimensional threshold array defines a build pattern for an associated dither operation;
   means adapted for selecting a foreground gray scale level and a background gray scale level unique thereto from the $2^m$ gray scale levels addressed by m higher order bits of n-bit binary encoded image data for each received pixel and applying it to a dither matrix associated therewith;
   dither means adapted for selectively populating each two-dimensional dither matrix for each received pixel in accordance with remaining (n−m+1) bits thereof in accordance with the threshold array; and
   means adapted for generating output image data corresponding to the encoded image data in accordance with each populated two-dimensional dither matrix wherein the output image is rendered with at least two distinct foreground and background gray scale level combinations of the $2^m$ gray scale levels, wherein the foreground of one combination is different from the foreground of a second combination.

2. The multi-bit halftone generator of claim 1 wherein the dither means includes means for selectively populating elements of the dither matrix so as to define a gray level unique to the selected one of the $2^m$ gray scale levels associated therewith.

3. The multi-bit halftone generator of claim 2 wherein the unique gray level is applied uniformly to all selectively populated elements of each dither matrix.

4. The multi-bit halftone generator of claim 1 wherein the threshold array defines a build pattern corresponding to each value represented by the (n−m+1) bits.

5. A method for generating multi-bit halftone images comprising the steps of:
   receiving n-bit binary encoded image data, the encoded image data including a plurality of pixels having $2^n$ gray scale levels, wherein n is an integer greater than 3;
   communicating data to an associated document processing device, which document processing device includes means for rendering a document having $2^m$ discrete gray scale levels, wherein m is greater than 1 and less than n wherein the document processing device has an ability to generate dots at $2^m$ gray scale levels;
   receiving data representative of a two-dimensional threshold array having $2^{(n-m+1)}$ elements, which two-dimensional threshold array defines a build pattern for an associated dither operation;
   selecting a foreground gray scale level and a background gray scale level unique thereto from the $2^m$ gray scale levels addressed by m higher order bits of n-bit binary encoded image data for each received pixel and applying it to a dither matrix associated therewith;
   selectively populating each two-dimensional dither matrix for each received pixel in accordance with remaining (n−m+1) bits thereof in accordance with the threshold array; and
   generating output image data corresponding to the encoded image data in accordance with each populated two dimensional dither matrix wherein the output image is rendered with at least two distinct foreground and background gray scale levels combinations of the $2^m$ gray scale levels, wherein the foreground of one combination is different from the foreground of a second combination.

6. The method for generating multi-bit halftone images of claim 5 wherein the step of selectively populating each two-dimensional dither matrix include selectively populating elements of the dither matrix so as to define a gray level unique to the selected one of the $2^m$ gray scale levels associated therewith.

7. The method for generating multi-bit halftone images of claim 6 wherein the unique gray level is applied uniformly to all selectively populated elements of each dither matrix.

8. The method for generating multi-bit halftone images of claim 5 wherein the threshold array defines a build pattern corresponding to each value represented by the (n−m+1) bits.

9. The method for generating multi-bit halftone images of claim 5 wherein each dither matrix is defined as a square array having n−m+1 elements in each row and column thereof.

10. A system for generating multi-bit halftone images comprising:
    an input operable for receiving n-bit binary encoded image data, the encoded image data including a plurality of pixels having $2^n$ gray scale levels, wherein n is an integer greater than 3;
    an output operable for communicating data to an associated document processing device, which document processing device includes means for rendering a document having $2^m$ discrete gray scale levels, wherein m is greater than 1 and less than n wherein the document processing device has an ability to generate dots at $2^m$ gray scale levels;

an input operable for receiving data representative of a two-dimensional threshold array having $2^{(n-m+1)}$ elements, which two-dimensional threshold array defines a build pattern for an associated dither operation;

a processor operable for selecting a foreground gray scale level and a background gray scale level unique thereto from the $2^m$ gray scale levels addressed by m higher order bits of n-bit binary encoded image data for each received pixel and applying it to a dither matrix associated therewith;

the processor further operable for selectively populating each two-dimensional dither matrix for each received pixel in accordance with remaining (n−m+1) bits thereof in accordance with the threshold array; and the processor further operable for generating output image data corresponding to the encoded image data in accordance with each populated two dimensional dither matrix wherein the output image is rendered with at least two distinct foreground and background gray scale levels combinations of the $2^m$ gray scale levels, wherein the foreground of one combination is different from the foreground of a second combination.

11. The system for generating multi-bit halftone images of claim 10, wherein the processor is further operable for selectively populating elements of the dither matrix so as to define a gray level unique to the selected one of the $2^m$ gray scale levels associated therewith.

12. The system for generating multi-bit halftone images of claim 11 wherein the unique gray level is applied uniformly to all selectively populated elements of each dither matrix.

13. The system for generating multi-bit halftone images of claim 10 wherein the threshold array defines a build pattern corresponding to each value represented by the (n−m+1) bits.

14. The system for generating multi-bit halftone images of claim 10 wherein each dither matrix is defined as a square array having n−m+1 elements in each row and column thereof.

* * * * *